US007469265B2

United States Patent
Dhong et al.

(10) Patent No.: US 7,469,265 B2
(45) Date of Patent: Dec. 23, 2008

(54) METHODS AND APPARATUS FOR PERFORMING MULTI-VALUE RANGE CHECKS

(75) Inventors: Sang Hoo Dhong, Austin, TX (US);
Silvia Melitta Mueller, St. Ingbert (DE);
Hiroo Nishikawa, Shiga (JP);
Hwa-Joon Oh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 10/687,437

(22) Filed: Oct. 16, 2003

(65) Prior Publication Data
US 2005/0086279 A1 Apr. 21, 2005

(51) Int. Cl.
*G06F 7/42* (2006.01)
*G06F 15/00* (2006.01)
(52) U.S. Cl. .................................. 708/505; 708/200
(58) Field of Classification Search ......... 708/200–209, 708/505, 490
See application file for complete search history.

(56) References Cited

U.S. PATENT DOCUMENTS

| 5,027,308 | A | * | 6/1991 | Sit et al. ................. 708/505 |
| 5,166,898 | A | * | 11/1992 | Ishihara ................. 708/505 |
| 5,550,767 | A | * | 8/1996 | Taborn et al. ............. 708/498 |
| 6,115,725 | A | * | 9/2000 | Shibata et al. ............ 708/203 |
| 6,205,461 | B1 | * | 3/2001 | Mansingh ................ 708/497 |
| 6,826,588 | B2 | * | 11/2004 | Bhushan et al. .......... 708/671 |
| 7,043,516 | B1 | * | 5/2006 | Wolrich et al. ........... 708/505 |

* cited by examiner

*Primary Examiner*—Chat C Do
(74) *Attorney, Agent, or Firm*—Dugan & Dugan

(57) ABSTRACT

In a first aspect, a method is provided for determining in which of n intervals a sum of two or more numbers resides. The method includes determining the two or more numbers, and providing fewer than n compress circuits each adapted to (1) input the two or more numbers; (2) input range information regarding ranges used to define the n intervals; and (3) compress the two or more numbers and the range information into two or more outputs. The method further includes employing the fewer than n compress circuits to determine in which of the n intervals the sum of the two or more numbers resides. Numerous other aspects are provided.

24 Claims, 3 Drawing Sheets

METHODS AND APPARATUS FOR PERFORMING MULTI-VALUE RANGE CHECKS

FIELD OF THE INVENTION

The present invention relates generally to microprocessor systems, and more particularly to floating point computations performed within microprocessor systems.

BACKGROUND OF THE INVENTION

Most computer systems employ floating point computations in which numbers are represented by a fractional component and an exponential component. The use of floating point computations offers numerous advantages, including the ability to accurately process very large and very small numbers that generally cannot be processed using a fixed point representation.

During most floating point computations, a fraction of an addend must be aligned with a fraction of a product before the addend and the product may be added. Such an alignment is based on the exponent difference of the addend and product.

For the efficient alignment of an addend and a product, the interval Fi (as defined by a range Ri) in which the exponent difference between the addend and product lies should be determined. In general, the exponent difference may reside in one of several intervals as defined by ranges R0, R1, R2, R3, etc. (e.g., intervals F0=0–R0, F1=R0–R1, F2=R1–R2, F3=R2–R3, etc.). Once the particular interval that contains the exponent difference (e.g., an integer value) is known, the addend and product may be aligned and added or otherwise combined.

One technique for determining in which interval an integer value (such as an exponent difference) resides employs a separate compare circuit for each interval. While effective, the use of a separate compare circuit for each interval is expensive and consumes chip area. A less hardware intensive solution would be desirable.

SUMMARY OF THE INVENTION

In a first aspect of the invention, a method is provided for determining in which of n intervals a sum of two or more numbers resides. The method includes determining the two or more numbers, and providing fewer than n compress circuits each adapted to (1) input the two or more numbers; (2) input range information regarding ranges used to define the n intervals; and (3) compress the two or more numbers and the range information into two or more outputs. The method further includes employing the fewer than n compress circuits to determine in which of the n intervals the sum of the two or more numbers resides.

In a second aspect of the invention, an apparatus is provided for use in determining in which of n intervals a sum of two or more numbers resides. The apparatus includes fewer than n compress circuits each adapted to (1) input the two or more numbers; (2) input range information regarding ranges used to define the n intervals; and (3) compress the two or more numbers and the range information into two or more outputs. The apparatus further includes a plurality of sign check circuits coupled to the compress circuits, the sign check circuits adapted to generate a sign check bit that corresponds to each of the n intervals based on the two or more outputs generated by the compress circuits. Numerous other embodiments are provided in accordance with these and other aspects of the invention.

Other features and aspects of the present invention will become more fully apparent from the following detailed description, the appended claims and the accompanying drawings.

DETAILED DESCRIPTION

Figure 1:
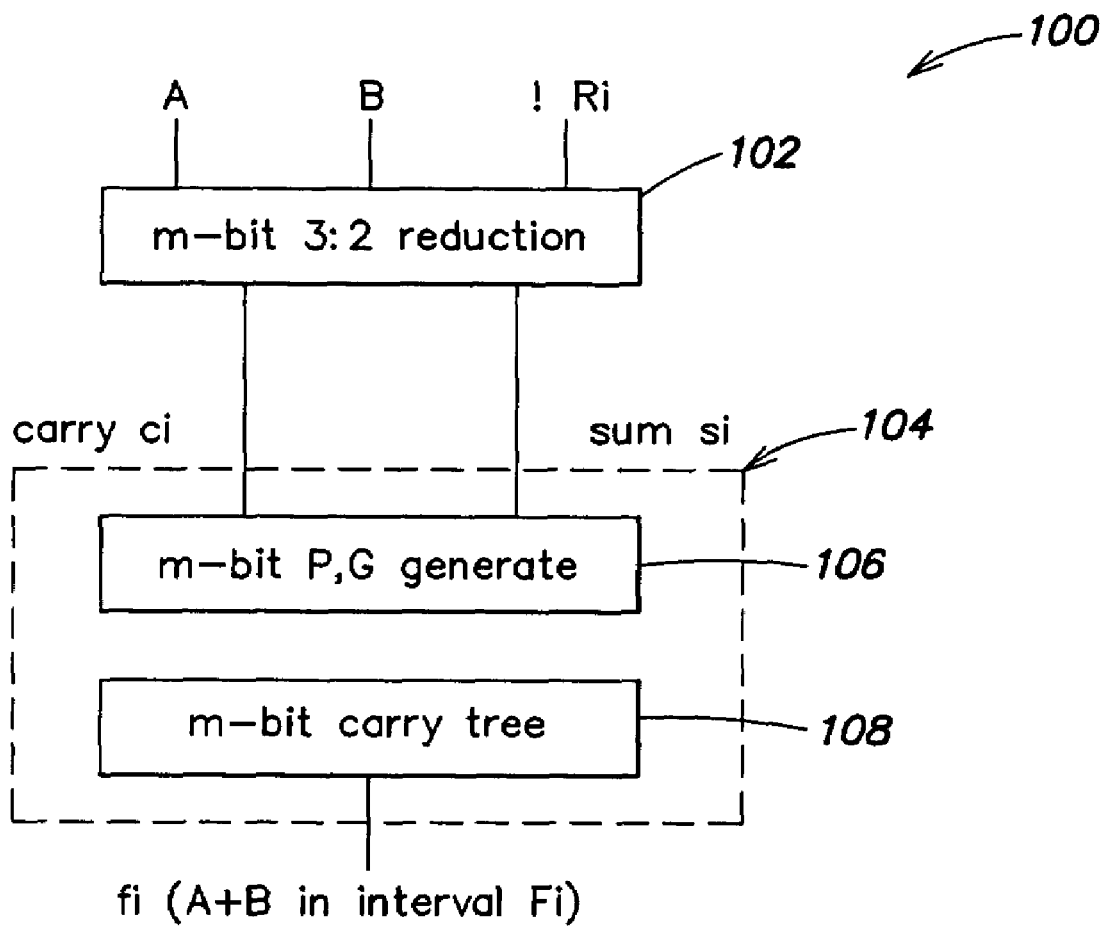
FIG. 1 is a block diagram of conventional range check logic for determining whether an integer resides within an interval Fi defined by a range Ri.

FIG. 1 is a block diagram of conventional range check logic 100 for determining whether an integer resides within an interval Fi defined by a range Ri. With reference to FIG. 1, the range check logic 100 includes compress circuitry (e.g., adder logic 102) coupled to sign check logic 104 (collectively referred to as "compare" circuitry or a compare circuit). In the example shown, the sign check logic 104 includes propagate and generate (P,G) logic 106 coupled to carry tree logic 108. The range check logic 100 and sign check logic 104 may be implemented in hardware, for example, as is known in the art.

The adder logic 102 includes adder circuitry adapted to add a first input A, a second input B and a third input !Ri (e.g., the inverse of the upper limit of the range Ri associated with the logic 100), and to generate a carry vector ci and a sum vector si based on the results of the addition. A 3:2 reduction thereby is produced by the range check logic 102. In the embodiment of FIG. 1, each input A, B and Ri comprises m-bits. In general, any bit size may be employed.

The P,G logic 106 is adapted to perform a bit-by-bit XOR and AND operation on each bit of the sum and carry vectors ci, si so as to generate P and G vectors. The P and G vectors then are fed to the carry tree logic 108.

Based on the P and G vectors produced by the P, G logic 106, the carry tree logic computes the most significant bit (MSB) of the sum of input A, input B and input !Ri (represented as fi in FIG. 1). As is known in the art, the MSB represents the sign of such an addition operation. If the sign of A+B+!Ri is positive (e.g., if the MSB is a logic 0, indicating that A+B–Ri is greater than 0) then the addend A+B does not lie within the interval Fi defined by the range Ri. However, if the sign of A+B+!Ri is negative (e.g., if the MSB is a logic 1, indicating that A+B–Ri is less than or equal to 0) then the addend A+B may lie within the interval Fi defined by the range Ri (as described further below).

Figure 2:
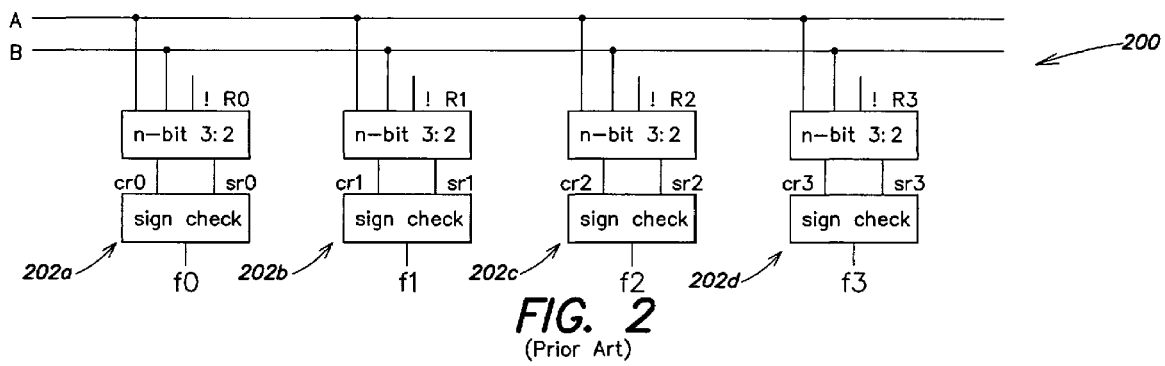
FIG. 2 is a block diagram of a conventional four value range check circuit that employs the value range logic of FIG. 1.

FIG. 2 is a block diagram of a conventional four value range check circuit 200 that employs the value range logic 100 of FIG. 1. With reference to FIG. 2, the four value range check circuit 200 includes four single range check circuits 202a-d each adapted to determine whether an addend A+B lies within one of four intervals F0, F1, F2 and F3 defined by ranges R0, R1, R2 and R3. Each value range check circuit 202a-d may be similar to the single value range logic 100 of FIG. 1.

As shown in FIG. 2, each single range check circuit 202a-d receives inputs A and B. The first single range check circuit 202a also receives input !R0 (e.g., the inverse of the upper limit of the range R0), and the single range check circuits 202b-d receive inputs !R1-!R3, respectively (e.g., the upper limits of ranges R1-R3, respectively). Based on the inputs A, B and a respective range limit value R0-R3, each single range check circuit 202a-d generates a sign check bit f0-f3, respectively. By examining which sign check bits are positive and which sign check bits are negative, the interval F0-F3 in which the addend A+B resides may be found. For example, if sign check bit f0 is positive, and sign check bits f1-f3 are negative, then the addend A+B lies within the interval between the ranges R0 and R1 (e.g., interval F1). Likewise, if sign check bits f0 and f1 are positive, and sign check bits f2 and f3 are negative, then the addend A+B lies within the interval between the ranges R1 and R2 (e.g., interval F2). Table 1 summarizes the interval F0-F3 in which addend A+B resides as indicated by the state of sign check bits f0-f3.

TABLE 1

| SIGN BIT f0 | SIGN BIT f1 | SIGN BIT f2 | SIGN BIT f3 | INTERVAL |
|---|---|---|---|---|
| − | − | − | − | 0-R0 (F0) |
| + | − | − | − | R0-R1 (F1) |
| + | + | − | − | R1-R2 (F2) |
| + | + | + | − | R2-R3 (F3) |
| + | + | + | + | >R3 |

While effective at identifying an interval in which an addend or other integer value resides, the conventional value range check circuit 200 requires a separate compare circuit (e.g., single range check circuit 202a-d) for each interval. As stated, requiring a separate compare circuit for each interval is expensive and consumes device real estate. A less hardware intensive solution would be desirable.

Figure 3:
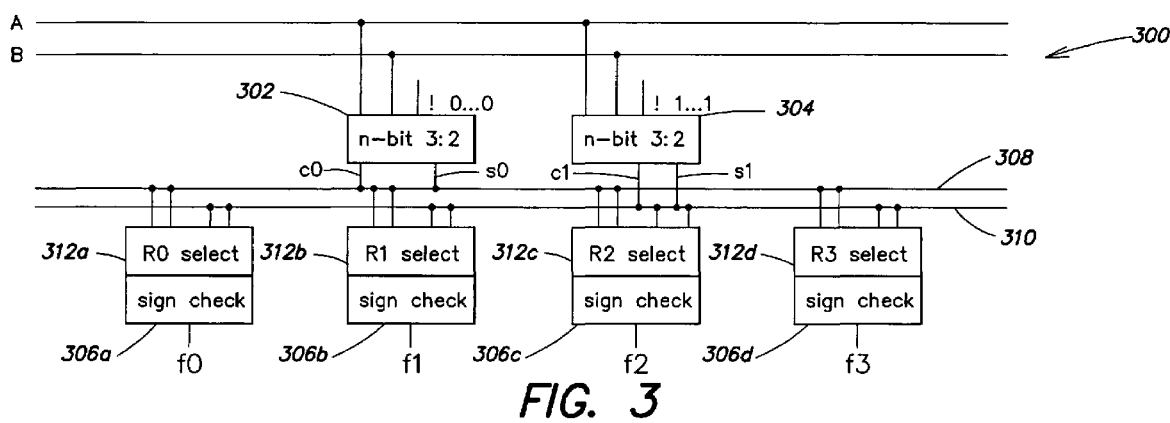
FIG. 3 is a block diagram of an inventive four value range check circuit provided in accordance with the present invention.

FIG. 3 is a block diagram of an inventive four value range check circuit 300 provided in accordance with the present invention. With reference to FIG. 3, the inventive range check circuit 300 includes first adder logic 302 and second adder logic 304 coupled to first, second, third and fourth sign check logic 306a-d as shown. In the embodiment shown, the first and second adder logic 302, 304 may include, for example, 3:2 add/compress logic adapted to compress 3 inputs into 2 outputs (e.g., a carry vector and a sum vector).

Rather than compressing A+B and !R0, !R1, !R2 and !R3 via separate adder logic, the first adder logic 302 compresses each bit of A+B with 0 and the second adder logic 304 compresses each bit of A+B with 1. For example, if A and B each comprises n-bits, the first adder logic 302 compresses/adds A+B+!0 (e.g., the inverse of 0) for each bit of A and B. In this manner, a carry vector c0 and a sum vector s0 are generated by the first adder logic 302. Likewise, the second adder logic 304 compresses/adds A+B+!1 (e.g., the inverse of 1) for each bit of A and B. A carry vector c1 and a sum vector s1 thereby are generated by the second adder logic 304.

The carry and sum vectors c0, s0 of the first adder logic 302 are output to a first bus 308. Similarly, the carry and sum vectors c1, s1 of the second adder logic 304 are output to a second bus 310. As indicated by reference numeral 312a in FIG. 3, the bits of the carry and sum vectors c0, s0 relevant to the range R0 and the first sign check logic 306a are selectively provided from the first bus 308 to the first sign check logic 306a; and the bits of the carry and sum vectors c1, s1 relevant to the range R0 and the first sign check logic 306a are selectively provided from the second bus 310 to the first sign check logic 306a. Such bit selection may be achieved, for example, by appropriate wiring between the first and second buses 308, 310 and the first sign check logic 306a. In one embodiment, if the upper limit of the range R0 has n bits (e.g., bits ranging from bit 0 to bit n-1), the bits of the carry and sum vectors c0, s0 and of the carry and sum vectors c1, s1 may be selectively provided to the first sign check logic 306a as follows:

(1) if a bit j of R0 has a logic value of 0, then the corresponding bit of carry c0 and the corresponding bit of sum s0 are provided (e.g., hard wired) to the first sign check logic 306a; and (2) if a bit j of R0 has a logic value of 1, the corresponding bit of carry c1 and the corresponding bit of sum s1 are provided (e.g., hard wired) to the first sign check logic 306a.

Likewise, as indicated by reference numerals 312b-d, the bits of the carry and sum vectors c0, s0 and c1, s1 relevant to ranges R1-R3 and the sign check logic 306b-d may be similarly provided (e.g., hardwired) to sign check logic 306b-d.

After receiving the appropriate carry and sum vectors bits, each sign check logic 306a-b operates similarly to the sign check logic of the conventional range check logic 200. That is, each sign check logic 306a-b generates a sign check bit f0-f3, respectively, as described previously with reference to the conventional range check logic 200 of FIG. 2. By examining which sign check bits are positive and which sign check bits are negative, the interval F0-F1 in which the addend A+B resides may be found. Table 1 also summarizes the interval F0-F3 in which addend A+B resides as indicated by the state of sign check bits f0-f3 generated by the inventive value range check logic 300 of FIG. 3.

Accordingly, when more than two ranges/intervals must be checked, the inventive value range check logic 300 may identify an interval in which an integer value resides without requiring separate compress circuits (e.g., adder logic) for each interval. In the example shown, two fewer compress circuits are required for a four interval system when the present invention is employed. In general, for n intervals, the present invention may save n-2 compress circuits.

In accordance with a second aspect of the invention, the complexity of the sign check logic 306a-d also may be reduced. That is, where possible, the propagate and generate (P,G) logic of the sign check logic 306a-d may be shared. For example, if two upper limit range vectors (e.g., Ri, Rj) share the same two consecutive bits, the two range vectors may share the P, G logic for one output bit (e.g., fi, fj). Employing this technique, in the four value range check logic 300 of FIG. 3, the P,G logic for range vector R2 may be eliminated entirely (as described below).

Figure 4:
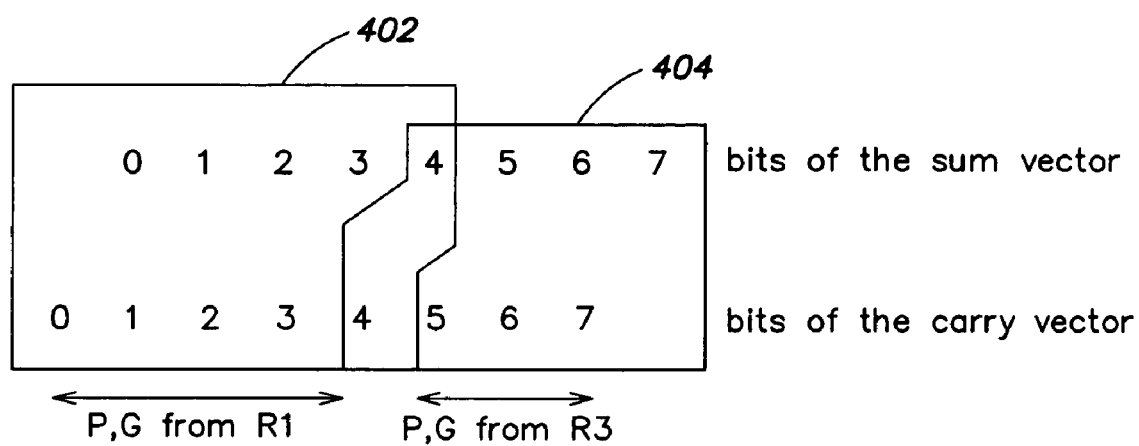
FIG. 4 is an exemplary schematic diagram that illustrates how propagate and generate logic may be reduced in accordance with the present invention.

FIG. 4 is an exemplary schematic diagram that illustrates how propagate and generate logic may be reduced in accordance with the present invention. With reference to FIG. 4, it is assumed that a four value range check is to be performed with intervals that are defined by ranges R0-R3 having upper limit vector values of:

R0=1001.1011
R1=1000.0100
R2=1000.0011
R3=0101.0011

In such an example, range vector R2 has the same five most significant bits as range vector R1 (as indicated by reference numeral 402 in FIG. 4). Also, range vector R2 has the same four least significant bits as range vector R3 (as indicated by reference numeral 404 in FIG. 4). Accordingly, the sign check logic 306c of FIG. 3 may employ the P,G logic (not shown) of the sign check logic 306b and of the sign check logic 306d when computing sign check bit f2. A further reduction in range value check logic thereby is realized.

Further reductions in range value check logic may be achieved; and such reductions may be employed with range value check logic having other numbers of ranges/intervals. Table 2 illustrates one exemplary method for determining whether sign check logic may be shared between ranges. With reference to Table 2, bits B0-B7 of the upper limit of range R0 ("range value R0") are aligned with (1) a left shifted version of range value R0; (2) range value R1; and (3) a left shifted version of range value R1. Each column then may be examined to determine if sign check logic may be shared during computation of sign check bit f0 for range R0 and/or of sign check bit f1 for range R1. For example, when the two bits of a column corresponding to a bit of R0 (e.g., R0 and R0 shifted in Table 2) are identical to the corresponding two bits of R1 (e.g., R1 and R1 shifted in Table 2), then sign check logic may be shared during computation of sign check bit f0 and/or sign check bit f1. In Table 2, column B8 reads X,1 for R0, R0 shifted and X,1 for R1, R1 shifted. Accordingly, the same sign check logic may be employed when computing the sign check bits f0 and f1, at least with regard to the most significant bit of R0 and R1. Likewise, because column B7 reads 1,0 for R0, R0 shifted and 1,0 for R1, R1 shifted, and column B6 reads 0,0 for R0, R0 shifted and 0,0 for R1, R1 shifted, the same sign check logic may be employed when computing sign check bits f0 and f1 with regard to the bits B6 and B7 of R0, R1. A similar analysis may be performed for each bit of each range, regardless of the number of ranges employed.

TABLE 2

|  | B8 | B7 | B6 | B5 | B4 | B3 | B2 | B1 | B0 |
|---|---|---|---|---|---|---|---|---|---|
| R0 | X | 1 | 0 | 0 | 1. | 1 | 0 | 1 | 1 |
| R0_SHIFTED | 1 | 0 | 0 | 1. | 1 | 0 | 1 | 1 | X |
| R1 | X | 1 | 0 | 0 | 0. | 0 | 1 | 0 | 0 |
| R1_SHIFTED | 1 | 0 | 0 | 0. | 0 | 1 | 0 | 0 | X |

The foregoing description discloses only exemplary embodiments of the invention. Modifications of the above disclosed apparatus and method which fall within the scope of the invention will be readily apparent to those of ordinary skill in the art. For instance, while the present invention has been described primarily with reference to a four value range check system and method, it will be understood that the invention may be employed for larger or smaller range check applications. Further, the present invention may be employed outside of a floating point context (e.g., in cryptographic engines or in any other application that requires multiple ranges to be checked).

In one or more embodiments of the invention, each compress circuit may input and compress more than three inputs. Likewise, each compress circuit may output more than two outputs (e.g., rather than just a sum and a carry). The sum A+B computed by a compress circuit may be, for example, related to an exponent of a floating point addend and an exponent of a floating point product (e.g., such that the sum A+B represents a difference between the exponent of the addend and the exponent of the product). More generally, the sum A+B computed by a compress circuit may be related to an exponent of a first floating point number and an exponent of a second floating point number.

Accordingly, while the present invention has been disclosed in connection with exemplary embodiments thereof, it should be understood that other embodiments may fall within the spirit and scope of the invention, as defined by the following claims.

The invention claimed is:

1. A method of determining in which of n intervals a sum of two or more numbers resides comprising:
   determining the two or more numbers; and
   providing fewer than n compress circuits where n is the number of intervals and each compress circuit is adapted to:
      input the two or more numbers;
      input range information regarding ranges used to define the n intervals; and
      compress the two or more numbers and the range information into two or more outputs; and
   employing the fewer than n compress circuits to determine in which of the n intervals the sum of the two or more numbers resides,
   wherein a result of a floating point computation in a processor is determined based on the determination of which of the n intervals the sum of the two or more numbers resides,
   wherein the providing results in less physical space used than if n compress circuits were provided.

2. The method of claim 1 wherein the two or more numbers are related to an exponent of a first floating point number and an exponent of a second floating point number.

3. The method of claim 2 wherein the two or more numbers are related to an exponent of a floating point addend and an exponent of a floating point product.

4. The method of claim 1 wherein:
   n is greater than 2; and
   providing fewer than n compress circuits comprises providing 2 compress circuits.

5. The method of claim 4 wherein each compress circuit comprises adder logic.

6. The method of claim 4 wherein each compress circuit is adapted to generate a carry vector and a sum vector based on three inputs.

7. The method of claim 1 wherein employing fewer than n compress circuits to determine in which of the n intervals the sum resides comprises:
   determining a sign check bit for each interval; and
   determining in which interval the sum resides based on the sign check bit for one or more of the intervals.

8. The method of claim 1 wherein employing fewer than n compress circuits to determine in which of the n intervals the sum resides comprises:
   generating carry and sum bits based on the two or more numbers and range information;
   selectively providing the carry and sum bits to a plurality of sign check circuits;
   determining a sign check bit for each interval based on the selectively provided bits; and
   determining in which interval the sum resides based on the sign check bit for one or more of the intervals.

9. The method of claim 8 wherein selectively providing the carry and sum bits to a plurality of sign check circuits comprises:
   if a bit j of a range value has a first logic value, providing a corresponding bit of a first carry and a corresponding bit of a first sum of a first of the compress circuits to a first of the sign check circuits that corresponds to the range value; and
   if the bit j of the range value has a second logic value, providing a corresponding bit of a second carry and a corresponding bit of a second sum of a second of the compress circuits to the first sign check circuit.

10. The method of claim 8 wherein determining a sign check bit for each interval comprises sharing a sign check circuit between two or more of the intervals.

11. An apparatus for use in determining in which of n intervals a sum of two or more numbers resides comprising:
fewer than n compress circuits where n is the number of intervals and each compress circuit is adapted to:
input the two or more numbers;
input range information regarding ranges used to define the n intervals; and
compress the two or more numbers and the range information into two or more outputs; and
a plurality of sign check circuits coupled to the compress circuits, the sign check circuits adapted to generate a sign check bit that corresponds to each of the n intervals based on the two or more outputs generated by the compress circuits,
wherein a result of a floating point computation in a processor is determinable based on the sign check bits,
wherein the providing results in less physical space used than if n compress circuits were provided.

12. The apparatus of claim 11 wherein the two or more numbers are related to an exponent of a first floating point number and an exponent of a second floating point number.

13. The apparatus of claim 11 wherein the two or more numbers comprise an exponent of a floating point addend and an exponent of a floating point product.

14. The apparatus of claim 11 wherein:
n is greater than 2; and
the fewer than n compress circuits comprise 2 compress circuits.

15. The apparatus of claim 14 wherein each compress circuit comprises adder logic.

16. The apparatus of claim 15 wherein each compress circuit is adapted to generate a carry vector and a sum vector based on three inputs.

17. The apparatus of claim 11 wherein the two or more outputs of each compress circuit comprise a sum vector and a carry vector each having a plurality of bits.

18. The apparatus of claim 17 further comprising a plurality of signal paths adapted to selectively route the bits of the carry and sum vectors of each compress circuit to the plurality of sign check circuits.

19. The apparatus of claim 18 wherein the sign check circuits are adapted to determine a sign check bit for each interval based on the selectively routed sum and carry bits.

20. The apparatus of claim 18 wherein the plurality of signal paths are configured so as to:
if a bit j of a range value has a first logic value, route a corresponding bit of a first carry and a corresponding bit of a first sum of a first of the compress circuits to a first of the sign check circuits that corresponds to the range value; and
if the bit j of the range value has a second logic value, route a corresponding bit of a second carry and a corresponding bit of a second sum of a second of the compress circuits to the first sign check circuit.

21. A method of determining in which of n intervals a sum of two or more numbers resides comprising:
determining the two or more numbers; and
providing fewer than n compress circuits where n is the number of intervals and each compress circuit is adapted to:
input the two or more numbers;
input range information regarding ranges used to define the n intervals; and
compress the two or more numbers and the range information into two or more outputs; and
employing the fewer than n compress circuits to determine in which of the n intervals the sum of the two or more numbers resides by:
generating carry and sum bits based on the two or more numbers and range information;
selectively providing the carry and sum bits to a plurality of sign check circuits;
determining a sign check bit for each interval based on the selectively provided bits; and
determining in which interval the sum resides based on the sign check bit for one or more of the intervals,
wherein a result of a floating point computation in a processor is determined based on the determination of in which interval the sum resides,
wherein the providing results in less physical space used than if n compress circuits were provided.

22. An apparatus for use in determining in which of n intervals a sum of two or more numbers resides comprising:
fewer than n compress circuits where n is the number of intervals and each compress circuit is adapted to:
input the two or more numbers;
input range information regarding ranges used to define the n intervals; and
compress the two or more numbers and the range information into a carry vector and a sum vector;
a plurality of sign check circuits coupled to the compress circuits, the sign check circuits adapted to generate a sign check bit that corresponds to each of the n intervals based on the carry and sum vectors generated by the compress circuits; and
a plurality of signal paths adapted to selectively route bits of the carry and sum vectors of each compress circuit to the plurality of sign check circuits,
wherein a result of a floating point computation in a processor is determinable based on the sign check bits,
wherein the providing results in less physical space used than if n compress circuits were provided.

23. The apparatus of claim 22 wherein the range information comprises a plurality logic 0 bits.

24. The apparatus of claim 22 wherein the range information comprises a plurality of logic 1 bits.

* * * * *